United States Patent [19]
Cook et al.

[11] Patent Number: 5,433,114
[45] Date of Patent: Jul. 18, 1995

[54] PRESSURE OR TEMPERATURE MEASURING APPARATUS AND A CARTRIDGE OF SENSORS FOR USE IN THE SAME

[75] Inventors: Stephen C. Cook, Derbyshire; Peter D. Smout, Derby, both of England

[73] Assignee: Rolls-Royce plc, London, England

[21] Appl. No.: 153,894

[22] Filed: Nov. 17, 1993

[30] Foreign Application Priority Data

Nov. 20, 1992 [GB] United Kingdom ............... 9224384

[51] Int. Cl.⁶ ..................... G01L 7/00; G01F 1/46
[52] U.S. Cl. ........................ 73/756; 73/115; 73/861.66
[58] Field of Search ............ 73/756, 182, , 180, 73/181, 861.65, 861.66, 861.67, 861.68, 115

[56] References Cited

U.S. PATENT DOCUMENTS 4,498,347  2/1985  Grantham et al. ............ 73/861.66
5,233,865  8/1993  Rossow ....................... 73/861.65

FOREIGN PATENT DOCUMENTS 0186609  2/1986  European Pat. Off.
883779  12/1961  United Kingdom.
1029522  5/1966  United Kingdom.
1264179  2/1972  United Kingdom.

Primary Examiner—Richard E. Chilcot, Jr.
Assistant Examiner—Joseph L. Felber
Attorney, Agent, or Firm—Cushman Darby & Cushman

[57] ABSTRACT

A rake for measuring pressures or temperatures in a gas flow includes an elongate member which has a single recess in the front face thereof. Within the recess are located a plurality of sensors. The recess defines a single cavity around the sensors and bleed slots are provided in the side faces of the member which are in fluid communication with the cavity. The sensors are connected to a remote pressure or temperature measuring system. In operation the rake is supported in a gas flow a proportion of which passes into the cavity. The cavity decelerates the gas and removes any swirl so that the sensors take an accurate measurement of the pressure or temperature. The gas then exits the cavity through the bleed slots.

15 Claims, 2 Drawing Sheets

PRESSURE OR TEMPERATURE MEASURING APPARATUS AND A CARTRIDGE OF SENSORS FOR USE IN THE SAME

FIELD OF THE INVENTION

The present invention relates to apparatus for measuring pressure or temperature in a gas flow and to a cartridge of sensors for use in the apparatus.

BACKGROUND OF THE INVENTION

During the testing of gas turbine engines it is often necessary to measure the pressure and temperature of the gas flow through the engine. Suitably positioned sets of pressure and temperature sensors are used to indicate circumferential and radial pressure and temperature profiles respectively at various axial positions throughout the engine. The sensors are mounted either on leading edges of existing engine components or in the absence of suitable hardware on purpose design poles, known as rakes, which slot into the engine.

Generally pressures are measured using pitot tubes and temperatures are measured using thermocouples. In conventional rakes the pitot tubes or thermocouples are mounted forward of the rake body and each is surrounded by a shroud. The shroud defines a cavity around the pitot tube or thermocouple through which a proportion of the gas flow passes. The shroud reduces flow incidence angle sensitivity and provides a measure of environmental protection.

A problem with conventional rakes is that the shrouds are difficult to manufacture and as they protrude forward of the rake body they are vulnerable. Shrouds have been damaged during installation into or removal from a test engine and difficulties have been encountered in repairing the damaged shrouds.

SUMMARY OF THE INVENTION

The present invention seeks to provide a pressure or temperature rake which is easier to manufacture and which is more compact and robust than conventional rakes.

According to the present invention an apparatus for measuring at least one of pressure and temperatures in a gas flow comprises an elongate member which is operationally located in the gas flow, the elongate member having a first surface which confronts the gas flow and a second surface downstream of the first surface, the first surface having a single recess therein in which a plurality of at least one of pressure and temperature sensors are located to measure at least one of pressure and temperatures in a plane normal to the direction of the gas flow, the single recess defining a single cavity around all of the sensors through which in operation a proportion of the gas flow passes, an opening being provided in the elongate member through which means for connecting the sensors to at least one of a remote pressure measuring system and a remote temperature measuring system passes, there being further provided at least one passageway through the elongate member which is in fluid communication with the cavity and through which in operation the gas flow exits from the cavity.

Preferably the single recess is a slot and the pressure and/or temperature sensors are equispaced from one another within the slot.

The opening in the elongate member may be provided in the second surface of the elongate member which is parallel to the first surface having the recess so that the sensors can pass through the opening in the second surface for location in the recess.

Preferably the recess has a chamfered inlet edge so that the angle at which the rakes can operate in a gas flow is increased.

The at least one passageway through the elongate member may be inclined so that the gas flow does not have to turn abruptly and exits smoothly from the cavities.

The elongate member preferably has an aerodynamic profile to minimize the disturbance it has on the gas flow into which it is inserted.

The plurality of pressure and/or temperature sensors may form an integral part of a cartridge which fits into the at least one recess.

Preferably the pressure sensors are pitot tubes and the temperature sensors are thermocouples.

A cartridge for use in the pressure or temperature measuring apparatus comprises an elongate member in which a plurality of pressure and/or temperature sensors are mounted so that they protrude therefrom and being provided with means for attaching the sensors to the means connecting the sensors to remote pressure and/or temperature measuring apparatus.

BRIEF DESCRIPTION OF THE DRAWINGS

The present invention will now be described with reference to the accompanying drawings in which.

DETAILED DESCRIPTION OF THE INVENTION

Figure 1:
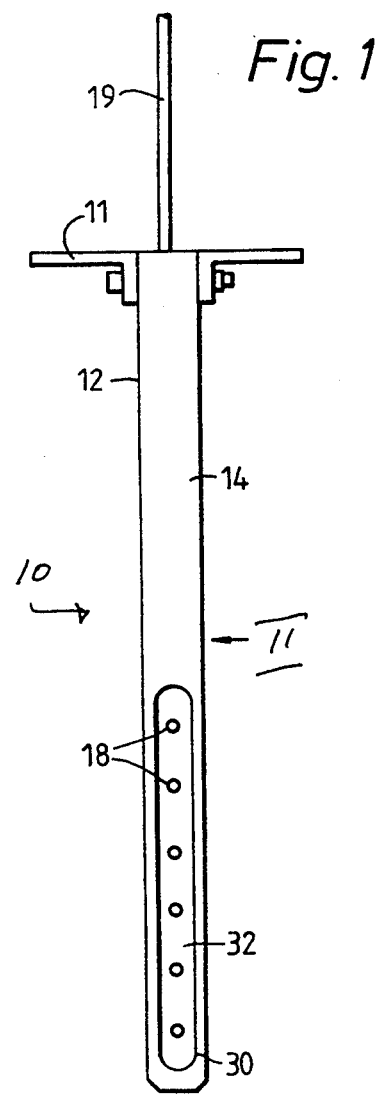
FIG. 1 is a top elevational view of a rake in accordance with an embodiment of the present invention.
Figure 3:
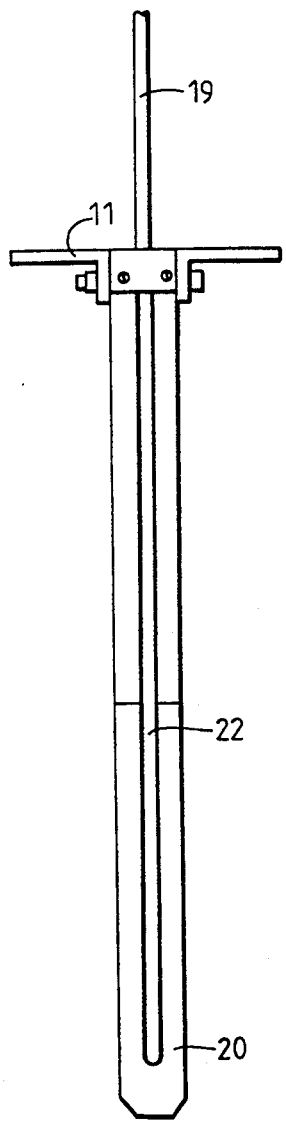
FIG. 3 is a view in the direction of arrow III in FIG. 2.

With reference to FIG. 1 a pressure rake generally indicated at 10 comprises an elongate member 12 the front face 14 of which has a single recess 30 therein. Within the recess 30 are located a plurality of pitot tubes 18. The pitot tubes 18 are inserted into the recess 30 through an opening 22, FIG. 3, in the rear face 20 of the member 12 and are brazed or glued into position. The pitot tubes 18 are equispaced within the recess 30 which defines a single cavity 32 around all of the pitot tubes 18. Bleed slots 34 are provided in the side faces 26 of the member 12 in FIG. 2 and are in fluid communication with the cavity 32. The bleed slots 34 are inclined so that the gas flow does not have to turn abruptly and exits smoothly from the cavities 32.

The pitot tubes 18 are connected to pressure tubes 19 located in the opening 22 in the rear face 20 of the member 12. The pressure tubes 19 connect the pitot tubes 18 to a remote pressure measuring system (not shown). The pressure measuring system is placed outside of the gas flow to minimize disturbance to the gas flow.

In operation the pressure rake 10 is inserted into a gas stream. A bracket 11 is attached to suitable hardware (not shown) and supports the elongate member 12 in position in the gas stream. A proportion of the gas stream flows into the cavity 32 and flows axially past the end of the pitot tubes 18. The cavity 32 decelerates the gas and removes any swirl in the gas.

Pressure measurements from the pitot tube 18 are transmitted via the pressure tube 19 and are recorded on the pressure measuring system. The gas flow then exits from the cavity 32 through the bleed slots 34 in each side face 26 of the member 12. The area of the inlet to the recess 30 is equal to the area of the bleed slots 34 through which the gas passes from the cavity 32 so that the pressure measured at each pitot tube 18 is not altered.

It will be appreciated by one skilled in the art that although the present invention has been described with reference to a pressure rake 10 that the same design could apply to a temperature rake. However thermocouples instead of the pitot tubes 18 would be mounted in the recess 30. The cavity 32 defined around all of the thermocouples decelerates the gas and removes any swirl in the gas. The low velocity gas flow passes over the thermocouple before exiting through the slots 34 in the side faces 26 of the member 12. The ratio of the area of the inlet to the recess 30 to the area of the bleed slots 34 is of the order of 3:1. Each thermocouple would be connected to temperature measuring apparatus by thermocouple cables located in the opening 22 in the rear face 20 of the member 12.

Alternatively a rake may be used which has a combination of temperature and pressure sensors mounted in the recess 30 so that temperature and pressure measurements can be taken from a particular location in the gas flow.

The recess 30 in the front face 14 of the member 12 performs the same function as the shrouds on a conventional pressure or temperature rake. Replacing the shrouds with the recess 30 simplifies manufacture of the rakes and the rakes are more compact and robust than existing rake designs. The inlet to the recess 30 may be chamfered to increase the angle at which the rakes can operate in a gas flow.

To minimize the disturbance caused by the rakes in the gas flow, they may have an aerodynamic profile. Alternatively the elongate member 12 may be an existing engine component, such as a vane, the sensors being mounted in a recess at the leading edge of the component.

Figure 2:
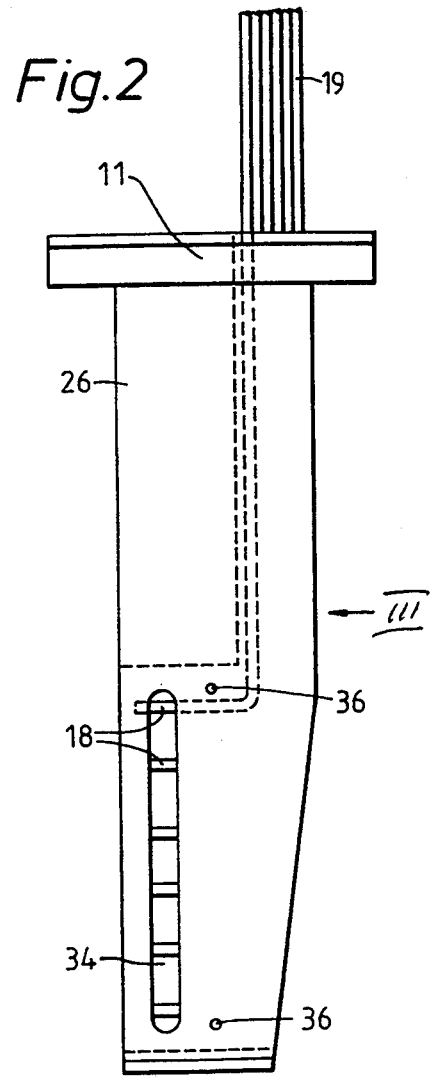
FIG. 2 is a view in the direction of arrow II in FIG. 1.
Figure 4:
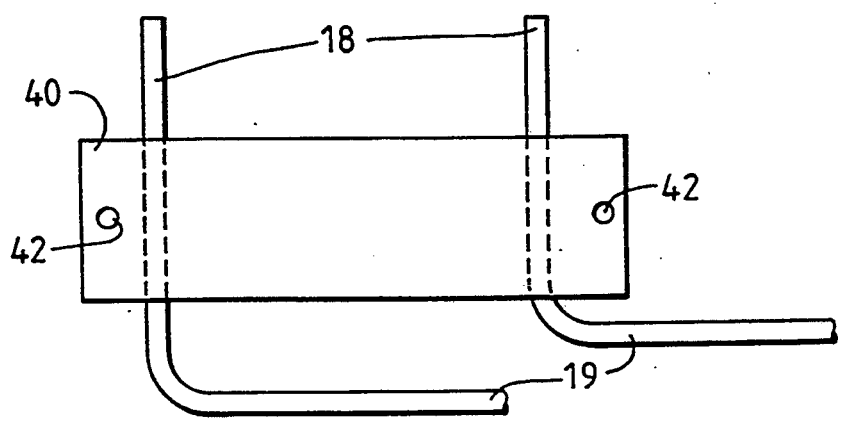
FIG. 4 is a pictorial view of a cartridge of sensors for use in a rake in accordance with the present invention.

The pitot tubes 18 or thermocouples could be mounted onto a removable cartridge 40, FIG. 4, which is inserted into the member 12 through the opening 22 in the rear face 20 of the member 12. The cartridge 40 is held in position in the member 12 by bolts (not shown). The bolts pass through bolt holes 42 in the cartridge and bolt holes 28 and 36, FIG. 2, provided in the side faces 26 of the member 12.

Mounting the pitot tubes 18 or thermocouples onto a removable cartridge 40 offers the advantage that should one or more of the sensors fail during a test the repair is simply a matter of replacing the cartridge 40 avoiding any time delay which could compromise the test. Also cartridges 40 with a different number of sensors per unit length or having sensors which are not equispaced could be readily interchanged.

We claim:

1. An apparatus for measuring at least one of pressures and temperatures in a gas flow comprising an elongate member which is operationally located in the gas flow, the elongate member having a first surface which confronts the gas flow and a second surface downstream of the first surface, the first surface having a single recess therein in which a plurality of sensor assemblies are located to measure at least one of pressures and temperatures normal to the direction of the gas flow, the single recess defining a single cavity around all of the sensors through which in operation a proportion of the gas flow passes, an opening being provided in the elongate member through which means for connecting the sensor assemblies to at least one of a remote pressure measuring system and a remote temperature measuring system passes, there being further provided at least one passageway through the elongate member which is in fluid communication with the cavity and through which in operation the gas flow exits from the cavity.

2. An apparatus as claimed in claim 1 in which the single recess is a slot.

3. An apparatus as claimed in 2 in which the ends of the sensor assemblies are equispaced from one another within the slot.

4. An apparatus as claimed in claim 1 in which the single recess has a chamfered inlet edge.

5. An apparatus as claimed in claim 1 in which the at least one passageway through the elongate member is inclined.

6. An apparatus as claimed in claim 1 in which the plurality of sensors assemblies form an integral part of a cartridge which fits into the recess.

7. An apparatus as claimed in claim 1 in which the sensors assemblies are pitot tubes which measure pressure.

8. An apparatus as claimed in claim 1 in which the sensor assemblies are thermocouples which measure temperature.

9. An apparatus as claimed in claim 1 further comprising a cartridge having said elongate member in which a plurality of pressure and temperature sensor assemblies are mounted so that they protrude therefrom and being provided with means for attaching the sensor assemblies to the means connecting the sensors to at least one of the remote pressure and temperature measuring systems.

10. An apparatus as claimed in any preceding claim in which the elongate member has an aerodynamic profile.

11. An apparatus for measuring at least one of pressures and temperatures in a gas flow comprising an elongate member which is operationally located in the gas flow, the elongate member having a first surface which confronts the gas flow and a second surface downstream of the first surface, the first surface having a single recess therein in which a plurality of sensor assemblies are located to measure said at least one of pressures and temperatures in a plane normal to the direction of the gas flow, the single recess defining a single cavity around all of the sensor assemblies through which in operation a proportion of the gas flow passes, an opening being provided in the elongate member through which means for connecting the sensor assemblies to at least one of a remote pressure measuring system and a remote temperature measuring system passes, there being further provided at least one passageway through the elongate member which is in fluid communication with the cavity and through which in operation the gas flow exits from the cavity, said opening being provided in the second surface of the elongate member which is parallel to said first surface having said recess so that said sensor assemblies can pass through said opening in said second surface for location in said recess.

12. A cartridge as claimed in claim 11 in which the sensors are equispaced from one another within the cartridge.

13. A cartridge as claimed in claim 11 in which the sensors are pitot tubes which measure pressure.

14. A cartridge as claimed in claim 11 in which the sensors are thermocouples which measure temperature.

15. An apparatus for measuring at least one of pressures and temperatures in a gas flow comprising an elongate member which is operationally located in the gas flow, the elongate member having a first surface which confronts the gas flow and a second surface downstream of the first surface, the first surface having a single recess therein in which a plurality of sensor assemblies are located to measure said at least one of pressures and temperatures in a plane normal to the direction of the gas flow, the single recess defining a single cavity around all of the sensor assemblies through which in operation a proportion of the gas flow passes, an opening being provided in the elongate member through which means for connecting the sensor assemblies to at least one of a remote pressure measuring system and a remote temperature measuring system passes, there being further provided at least one passageway through the elongate member which is in fluid communication with the cavity and through which in operation the gas flow exits from the cavity, said apparatus further comprising said elongate member in which a plurality of pressure and temperature sensor assemblies are mounted so that they protrude therefrom and being provided with means for attaching the sensor assemblies to the means connecting the sensor assemblies to at least one of remote pressure and temperature measuring apparatus.

* * * * *